United States Patent [19]
Yamawaki et al.

[11] 3,711,832
[45] Jan. 16, 1973

[54] CODE NUMBER DETECTING DEVICE

[75] Inventors: Shunro Yamawaki, Tokyo; Isao Ohyama, Yokohama, both of Japan

[73] Assignee: Tokico Ltd., Kawasaki, Kanagawa-ken, Japan

[22] Filed: Oct. 14, 1970

[21] Appl. No.: 80,629

[30] Foreign Application Priority Data

Oct. 17, 1969 Japan ..................44/83045
Oct. 24, 1969 Japan ..................44/84658
Oct. 25, 1969 Japan ..................44/85516

[52] U.S. Cl. ..................340/149 R, 307/136
[51] Int. Cl. ..................H01h 9/30, H04q 1/20
[58] Field of Search ........321/14; 320/60; 340/149 R, 340/149 A, 253 R; 307/136

[56] References Cited

UNITED STATES PATENTS

| | | | |
|---|---|---|---|
| 3,559,173 | 1/1971 | Leuasseur | 340/149 A |
| 3,184,714 | 5/1965 | Brown et al. | 340/149 A |
| 3,230,440 | 1/1966 | Kleiner | 321/14 |
| 3,386,005 | 5/1968 | Roland et al. | 321/14 X |
| 3,527,997 | 9/1970 | Nercessian | 321/14 |
| 3,539,990 | 11/1970 | Colvert | 340/149 R |

*Primary Examiner*—Donald J. Yusko
*Attorney*—Waters, Roditi, Schwartz & Nissen

[57] ABSTRACT

A code number detecting device is provided which reads and detects a code number of a code member. When the detected code number is in accord with a preset code number, the device actuates an operating circuit. The action of the operating circuit causes a fuel suction pump to become inoperative. In the device is a code number reading means which includes a safety power source circuit by which a voltage supply circuit is substantially opened when a load circuit is short-circuited.

6 Claims, 5 Drawing Figures

CODE NUMBER DETECTING DEVICE

This invention relates to a code number detecting device, and more particularly to a device for reading and detecting a code number of a code member such as a credit card or the like of the type which maybe used in a fuel supplying station.

A credit card system which issues to individual customers credit cards having different and particular code numbers has been in common usage in conventional fuel supplying stations, banks, department stores and the like. In the aforementioned credit card system, it is required that a specified credit card be inserted into the device for reading and detecting the code number of the credit card (hereafter called the card reader) for the settlement of accounts and the consequent receipt and payment of cash. It often occurs that a customer loses his card and he is newly issued a substitute card. It is then required to make his lost card and to forbid its use by other persons. There is therefore provided a means for preventing the lost card from being taken out from the card reader when the card is inserted into the card reader or a means for issuing an alarm when the finder of a lost card improperly uses the card.

The credit card system currently employed in gasoline supplying stations or selfservice fuel supplying stations usually issues particular credit cards having different numbers respectively to individual customers. According to this system, when the credit card is inserted into the card reader, the fuel supplying apparatus is adapted to supply fuel and to print the quantities of the supplied fuel and the code number of the card on a bill. If the card is lost, the fuel supplying apparatus must be set so that the fuel supply cannot be used by the finder of the lost card when he intends to use it improperly. Further to these instances, it is desirable to provide a locking means for preventing the removal of the card from the card reader or a means for issuing an alarm.

In such a place as a gasoline supplying station where explosive gas atmospheres are present, the code number detection device which uses electrical circuits must have an explosion proof construction to avoid explosions from short-circuiting, grounding or disconnection of wires. Thus, it is necessary for the code number detecting device to have a safety power source circuit which will not supply a voltage to a load circuit nor transmit an excess current to the load circuit when short-circuiting or other such accident occurs in the load circuit.

Therefore, it is a general object of the present invention to provide a novel and useful code number detecting device which can well meet the above pertinent requirements.

Another object of the invention is to provide a code number detecting device which can issue output signals relative to locking, alarm and the like in response to a particular code number set in the device.

A further object of the invention is to provide a code number detecting device of a construction which has an explosion proof construction using a safety power source circuit which can not induce the explosion of a dangerous gas atmosphere when short-circuiting or other accidents occur in the electrical circuit of the system.

A still further object of the invention is to provide a code number detecting device in a fuel supplying station.

To achieve the above and other objects of the invention, there is provided a code number detecting apparatus comprising a safety power source circuit, a plurality of switches respectively connected in parallel to said safety power source circuit and being opened or closed in response to a code number provided on a code member, a plurality of relays respectively connected in series through the respective switches and in parallel to each other with respect to the safety power circuit, and a code number detecting means comprising a plurality of relay switches which are respectively opened or closed by said relays and for reading the code number of the code member in response to the opened or closed states of said plurality of relay switches, said code number detecting means being insulated from said safety power source circuit switches and relays.

According to a further feature of the invention, the aforesaid safety power source circuit comprises an insulating transformer, a transistor provided in a voltage supply path on the secondary side of the transformer, means for supplying a base voltage to maintain the transistor in conducting state and means for detecting an excess current flowing when a load circuit system of the safety power source circuit is short circuited and for making the transistor non-conducting.

These and other objects and features of the invention will become apparent from the following description with reference to the accompanying drawings, in which.

Figure 1:
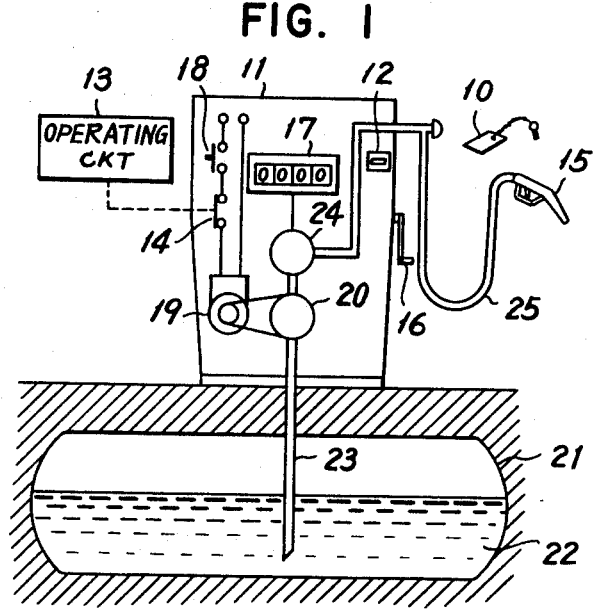
FIG. 1 is a diagrammatic view of a fuel supplying device in a fuel supplying station to which a code number detecting device of this invention has been applied.

Referring now to FIG. 1, a customer brings his credit card 10 to receive a fuel supply service and he inserts the card into an insertion slot of a card reader 12 provided in a gasoline stand 11. The card 10 has a code number particularly specified for the customer. As later described, the code number of the card 10 can be properly read out by the card reader 12. If the code number of the card 10 is not in accordance with a preset code number, there is no issuance of an output signal from an operating circuit 13. Then, a normally closed switch 14 is maintained in closed condition.

When a nozzle 15 is taken away from a nozzle hanger on the outer shell 11 and a handle 16 is turned through one complete turn, the dial on an indicator 17 is set to zero and a start switch 18 is closed. In response to closing of the switch 18, a motor 19 starts and a suction pump 20 operates. Upon opening of the valve of the nozzle 15, the pump 20 sucks up gasoline 22 from an underground fuel reservoir 21 through a fixed pipe 23. The gasoline passes through a flowmeter 24 and a hose 25, and is discharged from the nozzle 15 into a tank of a vehicle. The quantity of fuel measured by the flowmeter 24 is displayed on the indicator 17.

Figure 2:
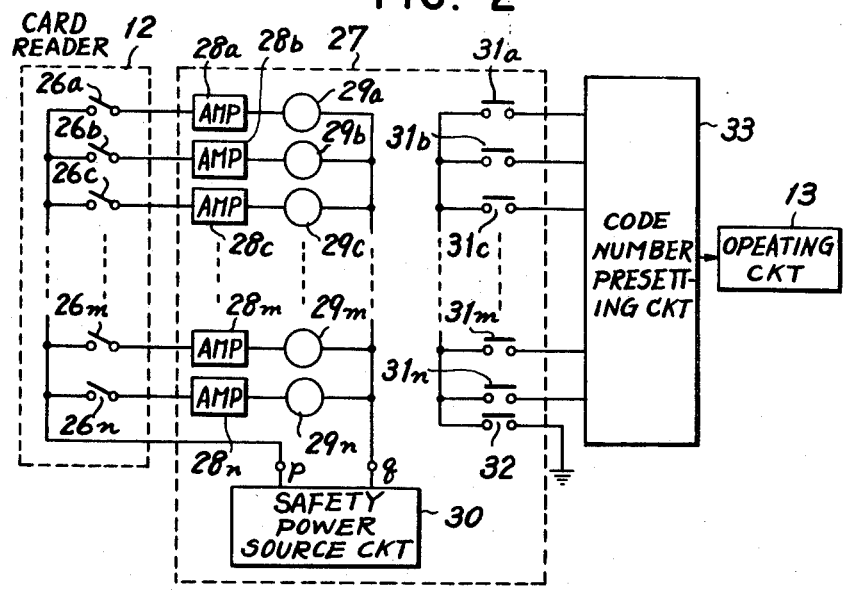
FIG. 2 is a diagrammatic circuit showing an electrical circuit system of the device according to one embodiment of the invention.

FIG. 2 shows a diagrammatic circuit of an electrical circuit of the device. In FIG. 2, it is seen that $n$ microswitches $26a-26n$ are provided in parallel connection in the card reader 12 enclosed by broken lines. The card 10 has recesses and projections thereon of shapes adapted for expressing the code number. When the card 10 is inserted into the card reader 12, the microswitches which correspond to the shape of the card 10 are closed.

As another type of the combination of the card 10 and the card reader 12, there may be used a type which comprises magnets and reed switches provided in the card reader so as to close the reed switches in response to the position of a magnetic metal bits in the card. As still another type, there is a non-contact type in which photoelectric elements are provided in the card reader in cooperation with through-holes in the card for reading and detecting the code number. In another type, a magnetic field of high frequency oscillation circuit in the card reader is modulated responsive to the location of the metal bits in the card and thereby reading and detection of the code number is effected. Binary code or decimal code or other preferred code systems may be used for the code number.

In the safety power source circuit system 27 shown enclosed by broken lines, amplifiers $28a-28n$ and relays $29a-29n$ are connected in series respectively to the microswitches $26a-26n$. The series circuits of microswitches, amplifiers, and relays in n-number are respectively connected in parallel to a safety power source circuit 30 of high power source impedance. Normally opened relay switches $31a-31n$ are electromagnetically closed by operation of respectively corresponding relays $29a-29n$. The relay switches $31a-31$ are respectively connected to a code number presetting circuit 33 as later described. The operating circuit 13 is actuated by the output of the presetting circuit 33. It will be noted that the circuit system consisting of the relay switches $31a-31n$, presetting circuit 33 and operating circuit 13 is constituted in a separate circuit system separated with respect to current from the circuit system including the power source circuit 30, and consisting of the microswitches $26a-26n$, amplifiers $28a-28n$ and relays $29a-29n$.

Figure 3:
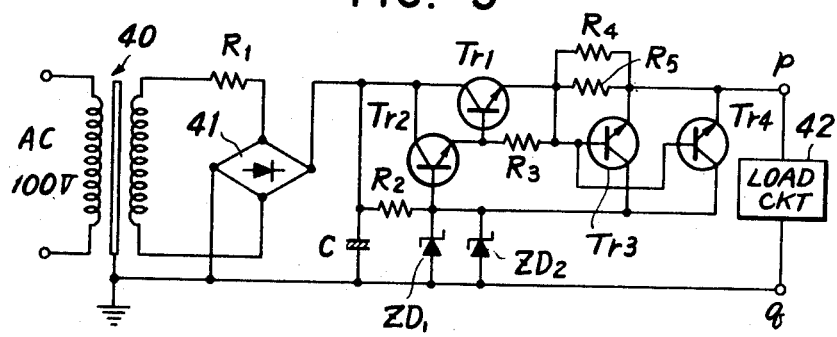
FIG. 3 is a circuit diagram of a safety power source circuit having an explosion proof circuit according to the invention.

The circuit diagram of the safety power source circuit 30 is shown in FIG. 3.

The secondary coil of an insulating transformer 40 is connected to a full-wave rectifier circuit 41, comprising diodes, through a transformer protecting resistor $R_1$. Smoothing capacitor C, constant voltage Zener diodes $ZD_1$ and $ZD_2$, Zener-current control resistor $R_2$, transistors $Tr_1-Tr_4$, base resistor $R_3$ of transistors $Tr_3$ and $Tr_4$, and resistors $R_4$ and $R_5$ between base-emitter of the transistors $Tr_3$ and $Tr_4$ are respectively connected each other as shown in the figure. Terminals $p$ and $q$ are connected to a load circuit 42 including the above-mentioned microswitches $26a-26n$, amplifiers $28a-28$ and relays $29a-29n$.

In the circuit of the above described construction, the base voltage of the transistor $Tr_2$ is determined by the constant voltage diodes $ZD_1$ and $ZD_2$ during normal operation, whereby the transistor $Tr_2$ having its collector connected to the rectifier circuit 41 is in conductive state. With the transistor $Tr_2$ conducting, the transistor $Tr_1$ having its, collector connected to its rectifier circuit 41 and the base connected to the emitter of transistor $Tr_2$ becomes conducting. As the resistance value of parallel connected resistors $R_4$ and $R_5$ is selected to be a small value, the base-emitter voltages of the transistors $Tr_3$ and $Tr_4$ are substantially constant and small, that is, less than the predetermined operating voltage of the transistor. Accordingly, the transistors $Tr_3$ and $Tr_4$ are in non-conductive state. The output current of the rectifier circuit 41 thus passes through the transistor $Tr_1$, resistors $R_4$ and $R_5$, and is supplied to the load circuit 42 as a fixed current.

Now, if short-circuiting occurs in the load circuit 42, then, respective emitters of the transistors $Tr_3$ and $Tr_4$ are grounded through the load circuit 42 and the emitter voltages becomes zero. On the other hand, by excess currents flowing in the resistors $R_4$ and $R_5$, a potential difference is produced at the bases and emitters of the transistors $Tr_3$ and $Tr_4$. This causes the transistors $Tr_3$ and $Tr_4$ to become conducting. If the transistors $Tr_3$ and $Tr_4$ are in conductive state, the voltages of the collector side of the two transistors becomes zero as on their emitter sides. Therefore, the voltages of both ends of the constant voltage diodes $ZD_1$ and $ZD_2$ may be equal and no current flows in the diodes. Thus, the base voltage of the transistor $Tr_2$ becomes zero and non-conducting and the transistor $Tr_1$ becomes non-conducting.

By non-conductance of the transistors $Tr_2$ and $Tr_1$, the power supply circuit to the load circuit 42 is substantially opened. Consequently, no voltage is supplied to the load circuit 42. No excess current flows through all elements of the load circuit 42 and danger is therefore prevented.

In the above-described embodiment, there are provided two transistors $Tr_3$ and $Tr_4$, constant voltage diodes $ZD_1$ and $ZD_2$, and resistors $R_4$ and $R_5$ respectively connected in parallel in order to improve the explosion proof character of the circuit. However, the circuit may be so constructed that it has respectively one transistor, constant voltage diode and resistor.

Figure 4:
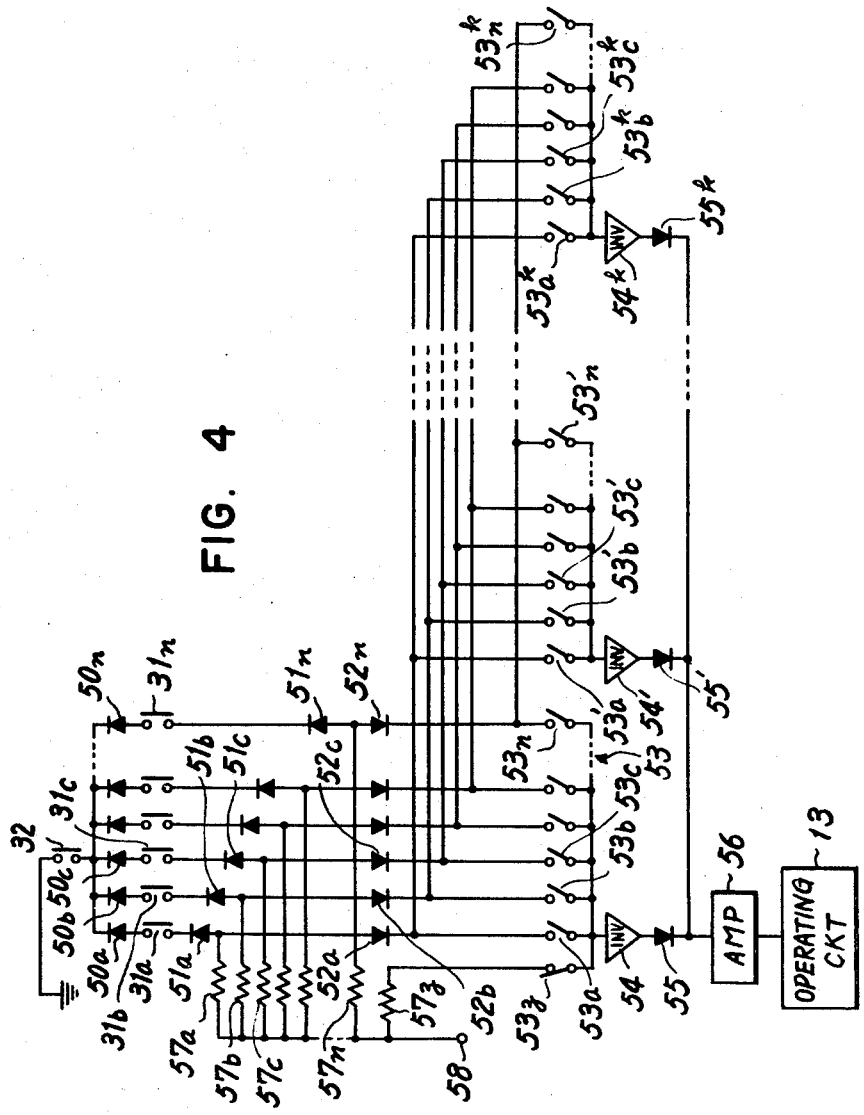
FIG. 4 is a circuit diagram of an embodiment of a code number presetting circuit according to the invention.

An embodiment of a circuit of the code number presetting circuit 33 is now shown in FIG. 4.

A card insertion confirmation switch 32 is normally opened and is closed by a front end of the card 10 when the card 10 is fully inserted into the card reader 12. One end of the switch 32 is grounded and the other end is connected to diodes $50a-50n$. Out of the switches $26a-26n$, the switches corresponding to code number of the card 10 inserted into the card reader 12 are closed as described above, while, of the relays $29a-29n$, the relays corresponding to the closed switches are actuated. The relay switches corresponding to the relays thus actuated, of the relay switches $31a-31n$, are closed.

For convenience of illustration, this embodiment shows only one card reader and one set of parallel connections of the diodes $50a-50n$ and switches $31a-31n$ in series connection. However, generally, when $k$- number units of the card readers are used, $k$-number sets of parallel connections of $n$-number units of diodes and switches in series connection respectively are connected in parallel. Diodes $50a$–$50n$, $51a$–$51n$, and $52a$–$51$ serve as diodes for preventing so called interaction or erroneous operation, when $k$ units of card readers 12 are connected in parallel, and when a plural sets of relay switches are closed.

Code number setting switches $53a$–$53n$, $53'a$–$53'n$, ---, $53^k a$–$53^k n$ (generally indicated as 53) are normally opened switches, respectively connected in series to relay switches $31a$–$31n$, of which sets are connected to each other in parallel. This switch 53 is normally provided in a code number setting device built in an office room or control room of a fuel supplying station. Here, for example, if the code number of the lost card is to be cancelled and invalidated, it may be arranged that previously a switch corresponding to the code number of the card out of the switches $53a$–$53n$ may be closed so as to preset an invalid code number to be put out of use. If the cards to be cancelled are plural in number, the switches, of the switches 53, consisting of plural sets of switches are closed corresponding to the code numbers so as to preset non-use code numbers.

Inverter circuits 54, 54', ---, $54^k$ are respectively connected in series to each set of switches $53a$–$53n$, $53'a$–$53'n$, ---, $53^k a$–$53^k n$. The inverter circuits 54, 54', ---, $54^k$ are respectively connected through diodes 55, 55', ---, $55^k$ to an amplifier 56. The output of the amplifier 56 is supplied to the operating circuit 13.

Resistors $57a$–$57n$ have their respective ends connected to a power source terminal 58 of voltage $V_1$. Other ends of the resistors are connected to points between the diodes $51a$–$51n$ and $52a$–$52n$. The resistors $57a$–$57n$ constitute a matrix circuit with the diodes $51a$–$51n$ and $52a$–$52n$. A resistor $57z$ has the same resistance value as the resistors $57a$–$57n$. The resistor $57z$ has an end connected to the power source terminal 58 and the other end connected to a normally closed switch $53z$. The switch $53z$ is connected in parallel with the switches $53a$–$53n$ and in series to the inverter circuit 54.

Figure 5:
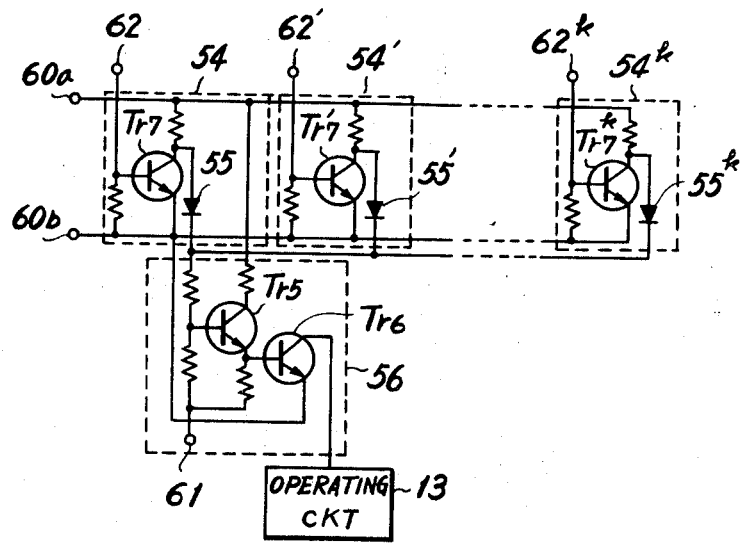
FIG. 5 is a circuit diagram of an output circuit according to the invention.

An embodiment of the output circuit including the inverter circuits $54$–$54^k$ is shown in FIG. 5. Between the power source terminals $60a$ and $60b$ of the inverter circuits $54$–$54^k$ is applied a voltage $V_2$. The amplifier 56 includes amplifying transistors $Tr_5$ and $Tr_6$. From a terminal 61 is supplied a voltage $V_3$. The inverter circuits $54$–$54^k$ have respectively transistors $Tr_7$–$Tr^k_7$. Terminals 62, 62', ---, $62^k$ of the base of each transistor $Tr_7$, $Tr'_7$, ---, $Tr^k_7$ are respectively connected to sets of switches ($53a$–$53n$, $53z$), ($53'a$–$53'n$), ---, ($53^k a$–$53^k n$).

The operating circuit 13 in this embodiment has a construction to open the switch so that the motor 19 for operating the suction pump 20 is not operated during the operation of the operating circuit. The described operating circuit 13 may otherwise have a construction including a circuit for locking the card 10 in the card reader 12 so that it cannot be taken out of the card reader 12 or an alarm circuit for operating the alarm buzzer lamp.

Operation of the circuit of the above described construction as shown in FIGS. 4 and 5 will now be illustrated.

Before presetting of the code number and operating of the circuit, the relay switches $31a$–$31n$, presetting switches $53a$–$53n$, ---, $53^k a$–$53^k n$ are all opened and the switch $53z$ is closed. The power source terminals 58, $60a$ and $60b$, and 61 are respectively provided a predetermined voltage. The transistor $Tr_7$ is in conductive state and the transistors $Tr_5$ and $Tr_6$ are in a cutoff and non-conductive state. The operating circuit 13 is thus out of operation.

The switch 53 is now closed for presetting in response to the code number of the card which has been lost and put to non-use. In one or more sets corresponding to the number of cards out of the sets of presetting switches ($53a$–$53n$), ($53'a$–$53'n$), ---, ($53^k a$–$53^k n$), the switches responsive to the code number are closed for the preset operation. Continuous to the closing and presetting operation of the described presetting switches, the switch $53z$ is opened. Here, if the switches $53b$ and $53c$ are closed for presetting, the voltage from the terminal 58 is applied to the inverter circuit 54 respectively through the resistors $57b$ and $57c$, diodes $52b$ and $52c$, and switches $53b$ and $53c$. The operating circuit 13 is therefore in an inoperative state.

In this state, if the lost and found card 10 as hereinbefore described is inserted into the card reader 12, the switch 32 is closed. In response to the code number of the card 10 read by the card reader 12, the relay switches $31b$ and $31c$, for example, out of the relay switches $31a$–$31n$ are closed and the code number is thus detected. The power source terminal 58 is grounded respectively through the resistors $57b$ and $57c$, forward diodes $51b$ and $51c$, relay switches $31b$ and $31c$, forward diodes $50b$ and $50c$, and switch 32. Accordingly, the voltages of the output sides of the resistors $57b$ and $57c$ become zero, and the voltage of the terminal 62 shown in FIG. 5 becomes zero.

As the base voltage of the transistor $Tr_7$ reaches zero, the transistor $Tr_7$ becomes non-conducting. Thereby, the base voltage of the transistor $Tr_5$ rises and the transistor $Tr_5$ becomes conducting. As the transistor $Tr_5$ becomes conducting, the transistor $Tr_6$ is now conducting and a signal is sent to the operating circuit 13 from the amplifier 56. Consequently, the operating circuit 13 actuates and opens the switch 14 shown in FIG. 1. In this condition, the motor 19 does not operate even if the switch 18 is closed.

Thus, the operating circuit 13 operates only when the code number of the switch out of the presetting switches ($53a$–$53n$), ---, ($53^k a$–$53^k n$) is in accord with the code number of the card 10 inserted into the card reader 12. Then, the operating circuit actuates the switch 14, card locking means or alarm means.

The member having the code number need not absolutely be confined to the card shape as in the above described embodiment, but it may take any other shape such as a square column shape or the like.

It is also possible to provide a preferred number of sets of the code number detecting part and code number setting part having presetting switches, although these were described as one card reader in the above-mentioned embodiment.

What we claim is:

1. A code number detecting apparatus comprising a safety power source circuit, a plurality of switches respectively connected in parallel to said safety power source circuit and being opened or closed in response to a code number of a code member, a plurality of relays respectively connected in series to the respective switches and in parallel to each other with respect to the safety power source circuit, and a code number detecting means comprising a plurality of relay switches which are respectively opened or closed by said relays and for reading the code number of the code member in response to the opened or closed states of said plurality of relay switches, said code number detecting means being separated with respect to current from said safety power source circuit, switches and relays.

2. The code number detecting apparatus as defined in claim 1 in which said safety power source circuit comprises an insulating transformer, a transistor provided in a voltage supply path on the secondary side of the transformer, means for supplying a base voltage to maintain the transistor in conducting state, and means for detecting an excess current flowing when a load circuit system of the safety power source circuit is short-circuited and for making the transistor non-conducting.

3. The code number detecting apparatus as defined in claim 2, in which said safety power source circuit comprises an insulating transformer, a first transistor means inserted in the voltage supply path on the secondary side of the transformer and made conductive or non-conductive by applied base voltage, resistors connected to the output side of the first transistor means, a second transistor means which is made conducting or non-conducting responsive to the potential difference generated in the resistors, and a constant voltage diode means applying a voltage to the base of the first transistor means, said diode means being connected to the second transistor means, said second transistor means and said constant voltage diode means being connected in parallel to a load circuit, wherein said second transistor means is made conducting by a potential difference generated in the resistors when an excess current is produced in the resistors and said first transistor means is made non-conducting, whereby the load circuit system is substantially opened.

4. The code number detecting apparatus as defined in claim 1 which further comprises a presetting means for presetting a predetermined code number, an output circuit for producing an output thereof when the code number detected by said code number detecting means accords with the code number preset and stored in said presetting means, and an operating circuit for operating by the output of said output circuit.

5. The code number detecting apparatus as defined in claim 2 in a liquid supplying apparatus comprising a suction pump for supplying liquid from a reservoir and a motor for driving the suction pump, in which said operating circuit maintains said motor in an inoperative condition by its operation.

6. The code number detecting apparatus as defined in claim 4, in which said presetting means includes a plurality of switches respectively connected to the switches of the detecting means and closed by presetting of the code number, said output circuit includes inverter circuits and amplifier circuits, said output circuit producing an output when the switches of the detecting means corresponding to the closed switches of the presetting means are closed.

* * * * *